US007251608B2

(12) United States Patent
Mayes et al.

(10) Patent No.: US 7,251,608 B2
(45) Date of Patent: Jul. 31, 2007

(54) FUND TRANSFERS USING POSTAGE INDICIA

(75) Inventors: Robert C. Mayes, Boise, ID (US); Donald K. Wadley, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1012 days.

(21) Appl. No.: 10/086,288

(22) Filed: Mar. 1, 2002

(65) Prior Publication Data

US 2003/0167243 A1 Sep. 4, 2003

(51) Int. Cl.
*G06Q 99/00* (2006.01)
*G06F 17/00* (2006.01)

(52) U.S. Cl. ............................ 705/1; 705/60; 705/401

(58) Field of Classification Search ................ 705/400, 705/401, 60, 1
See application file for complete search history.

(56) References Cited

U.S. PATENT DOCUMENTS 6,289,323 B1 * 9/2001 Gordon et al. ................ 705/40
6,427,139 B1 * 7/2002 Pierce ......................... 705/60
6,865,558 B1 * 3/2005 Pierce et al. .................. 705/60

FOREIGN PATENT DOCUMENTS

WO WO 00/79455 * 12/2000

OTHER PUBLICATIONS

"Deployers and Retailers Can Both Win with ATMs." American Banker, p. 16 Feb. 24, 1998.*

* cited by examiner

*Primary Examiner*—John W. Hayes
*Assistant Examiner*—Rutao Wu

(57) ABSTRACT

A delivery service is operated using a method that receives a mail piece addressed to an entity. The mail piece includes postage indicia indicating an initial value. The delivery service determines a cost for delivering the mail piece to the entity. The delivery service modifies the postage indicia to indicate a remaining value wherein the remaining value indicates the initial value reduced by the cost for delivering the mail piece. The delivery service delivers the mail piece to the entity. The entity presents the postage indicia to the delivery service and the delivery service compensates the entity for the remaining value of the postage indicia.

17 Claims, 3 Drawing Sheets

FUND TRANSFERS USING POSTAGE INDICIA

BACKGROUND OF THE INVENTION

1. Field of the Invention

The invention is related to the field of delivery systems, and in particular, to fund transfers using postage indicia for a delivery service.

2. Statement of the Problem

The United States Postal Service (USPS) is one of many delivery services that a person can choose from to deliver a package. The USPS charges a fee for delivering packages. The fee is paid in the form of postage and the USPS typically requires that a package include postage before delivering the package. The amount of the postage depends on the weight and size of the package. The amount of the postage also depends on the type of service used to deliver the package, such as next day delivery, first class mail, certified, etc. The postage indicates the amount of money that has been paid for the package to be delivered.

One example of postage is postage stamps. Another example of postage is metered postage that is printed by a postage meter device. A postage meter device interfaces with a postage meter belonging to the USPS. A customer applies for a postage meter with the USPS. If approved, the USPS leases the postage meter to the customer. The customer pre-pays for postage on the postage meter. For example, the customer would pre-pay for $250 worth of postage that is programmed onto the postage meter. The customer then buys or leases a postage meter device, which is not supplied by the USPS. Some examples of companies that manufacture postage meter devices are Pitney-Bowes and NeoPost. The customer interfaces the postage meter with the postage meter device to print the metered postage. Each time the postage meter device prints the metered postage, the postage meter decrements against the pre-paid amount.

To send a package, the sender affixes postage onto the package and gives the package to the USPS. The USPS sorts the package so that it is delivered to the proper location. The USPS also cancels the postage. Canceling the postage usually involves stamping the postage with a postmark. Postmarks generally show the date and the name, state, and ZIP code of the post office handling the package. The postmark indicates to the USPS that the postage cannot be used again. The USPS then delivers the package to the destination address.

Other delivery services operate in a similar manner as described above. Examples of other delivery services are the United Parcel Service (UPS) and Federal Express (FedEx).

An entity can transfer funds to another entity in a variety of ways. An entity can use cash, a check, and a credit card to transfer funds to another entity. An entity can transfer funds from its bank account to a bank account of another entity. An entity can use a commercial wire-transfer company to transfer funds to another entity, such as Western Union. Another common way to transfer funds is through the use of a postal money order.

Unfortunately, postage for the USPS and other delivery services has rarely been used to transfer funds. Occasionally small items are paid for with postage, particularly when the cost is low and the purchase is conducted through the mail. In these circumstances, the postage used as currency is inside the package, and is not cancelled by the USPS. Thereafter, the uncancelled postage is usable on later unrelated packages. As for the postage on the outside of the package, the USPS cancels the entire value of the postage, even if the value of the postage is more than the cost for that delivery. The postage has no value once the postage has been cancelled. Postage is typically intended for and calculated for a single mailing event. An entity cannot redeem additional value of the postage above the cost of delivery, because that postage has been cancelled as compensation for that particular mailing event.

SUMMARY OF THE SOLUTION

The invention helps solve the above problems by transferring funds using postage indicia for a delivery service. Advantageously, an entity can simply transfer funds by including additional value to the postage indicia when sending a package. The additional value is in excess of the cost of delivering the package. The additional value can be used to send payments, return postage, or money to another entity. This can be a very secure method of transferring funds, because the delivery service may be the only facility that will give payment for the additional value of the postage indicia. In this way, an item is printed which combines the benefits of postage with those of the postal money order into a single item. This item can be affixed to the surface of a package or other mail piece, or it may be a standalone mail piece such as a post card having the postage and funds transfer indicia both printed or affixed to the surface thereof.

One embodiment of the invention comprises a method of operating a delivery service. In accord with the method, the delivery service receives a mail piece for delivery that is addressed to an entity. The mail piece includes postage indicia indicating an initial value. The delivery service determines a cost for delivering the mail piece to the entity. The delivery service modifies the postage indicia to indicate a remaining value wherein the remaining value indicates the initial value reduced by the cost for delivering the mail piece. The delivery service delivers the mail piece to the entity. The entity presents the postage indicia to the delivery service, and the delivery service compensates the entity for the remaining value of the postage indicia.

Another embodiment of the invention comprises a delivery service comprised of a first mail system and a second mail system. The delivery service receives a mail piece for delivery that is addressed to an entity. The first mail system receives the mail piece. The mail piece includes postage indicia indicating an initial value. The first mail system determines a cost for delivering the mail piece to the entity. The first mail system modifies the postage indicia to indicate a remaining value wherein the remaining value indicates the initial value reduced by the cost for delivering the mail piece. The first mail system then transfers the mail piece. The delivery service delivers the mail piece to the entity.

The entity presents the postage indicia to the delivery service. The second mail system receives the postage indicia indicating the remaining value. The second mail system processes the postage indicia to determine the remaining value of the postage indicia. The second mail system then indicates the remaining value of the postage indicia. The second mail system could indicate the remaining value of the postage indicia by displaying the remaining value with a user interface. The second mail system may also compensate the entity based on the remaining value of the postage indicia.

Another embodiment comprises postage indicia that includes a first monetary value component and a second monetary value component. The first monetary value component is designated for compensating a delivery service for delivery of a mail piece. The second monetary value component is designated for transferring funds via the postage indicia. Other embodiments include a printing system configured to print the postage indicia and a reading system for reading the second monetary value component from the postage indicia.

DESCRIPTION OF THE DRAWINGS

The same reference number represents the same element on all drawings.

DETAILED DESCRIPTION OF THE INVENTION

Figure 1:
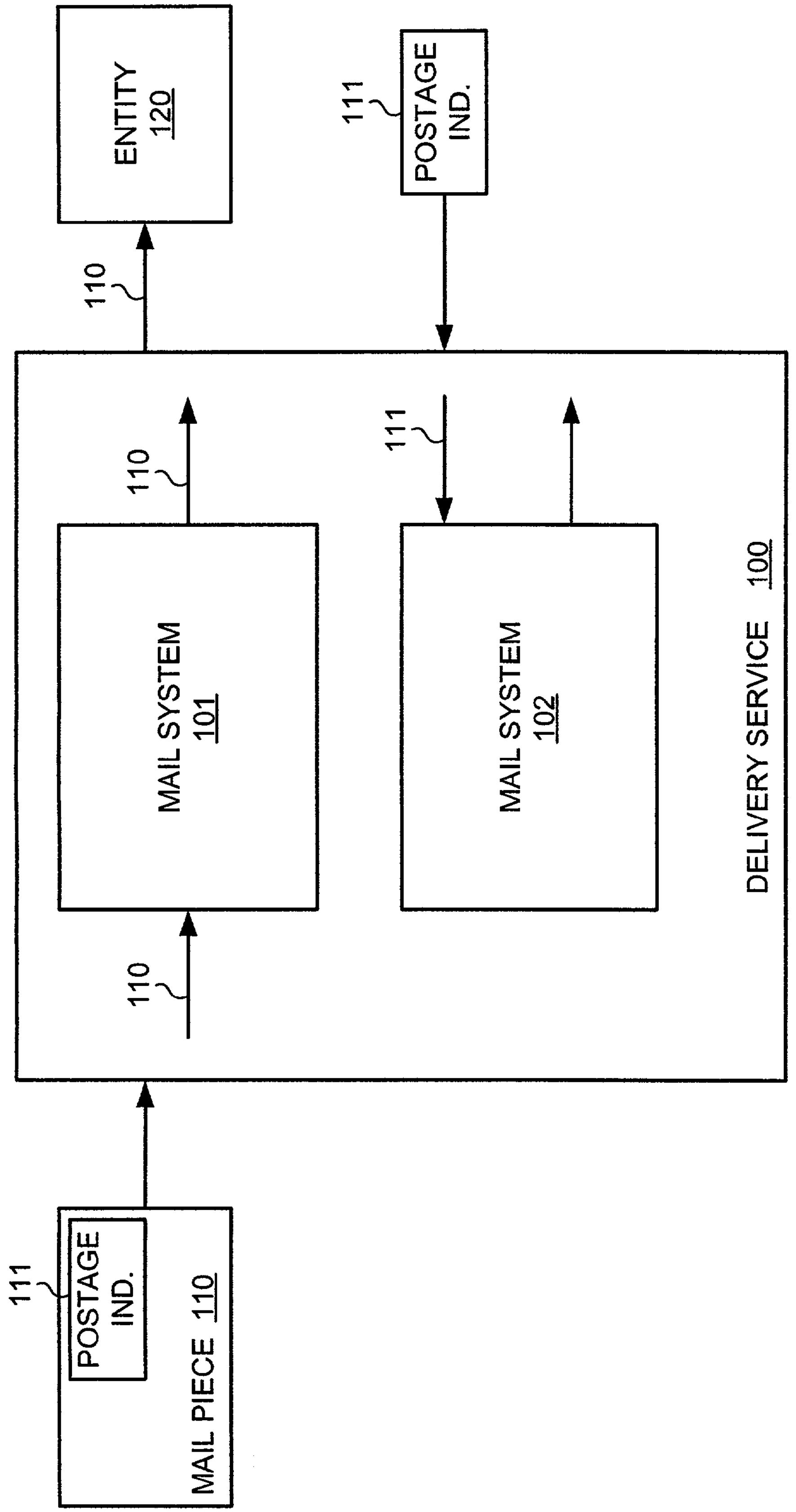
FIG. 1 illustrates a delivery service in an example of the invention.
Figure 2:
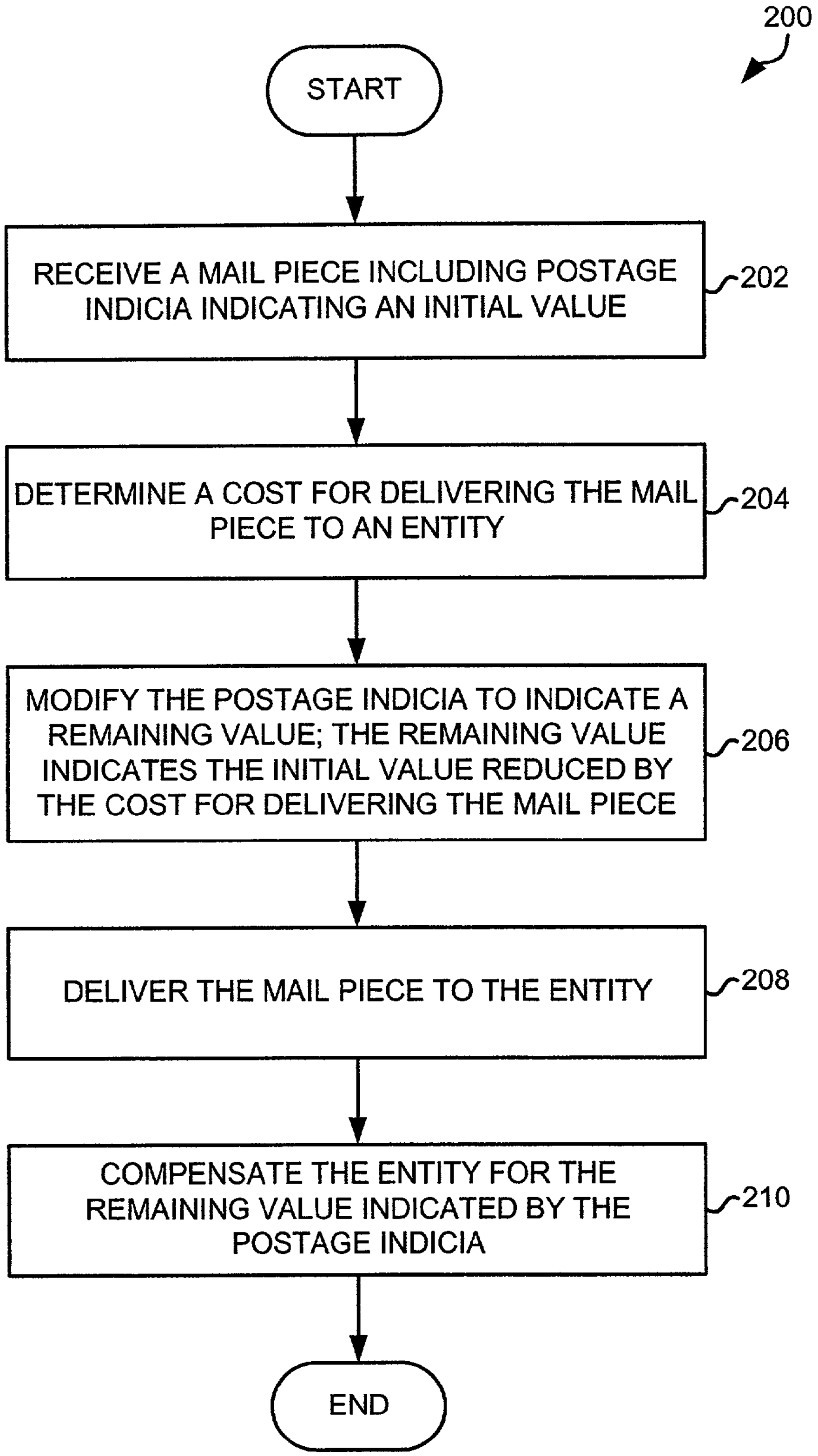
FIG. 2 illustrates a method of operating a delivery service in an example of the invention.
Figure 3:
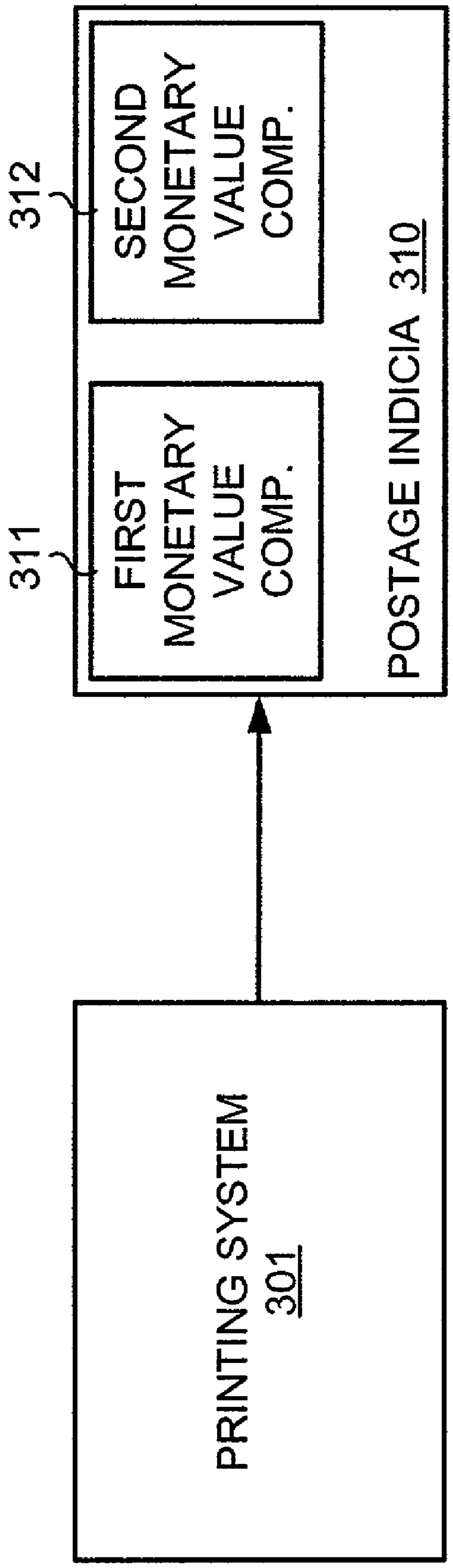
FIG. 3 illustrates a printing system for printing postage indicia in an example of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Delivery Service—FIG. 1

FIG. 1 illustrates a delivery service 100 in an example of the invention. Delivery service 100 is comprised of mail system 101 and mail system 102. If desired, mail system 101 could be in communication with mail system 102.

The following definitions are used in the context of the invention. A mail piece includes any object or item that can be delivered by a delivery service. Postage indicia includes any indication of payment for a delivery to be performed by a delivery service. Examples of postage indicia are text printed on a mail piece, postage stamps, and a barcode or other code printed on the mail piece. A delivery service includes any entity that facilitates delivery of a mail piece for a fee.

An entity (not shown) gives mail piece 110 to delivery service 100 to have delivery service 100 deliver mail piece 110 to entity 120. Mail piece 110 may be handled or processed by multiple systems or people within delivery service 100, which are not shown to simplify FIG. 1. Mail system 101 receives mail piece 110 addressed to entity 120. Mail system 101 could receive mail piece over a conveyor system, from a person, or any other means. Mail piece 110 includes postage indicia 111. Postage indicia 111 indicates an initial value. After receiving mail piece 110, mail system 101 determines a cost for delivering mail piece 110 to entity 120. Mail system 101 modifies postage indicia 111 to indicate a remaining value wherein the remaining value indicates the initial value reduced by the cost for delivering mail piece 110. Mail system 101 could print the remaining value on postage indicia 111. Mail system 100 could also cancel a portion of postage indicia with a postmark so that postage indicia indicates the remaining value. Mail system 101 then transfers mail piece 110. Delivery service 100 delivers mail piece 110 to entity 120.

Entity 120 returns postage indicia 111 to delivery system 100 to redeem the remaining value of the postage. Mail system 102 receives postage indicia 111 indicating the remaining value. Mail system 102 processes postage indicia 111 to determine the remaining value of postage indicia 111. Mail system 102 then indicates the remaining value of postage indicia 111. Mail system 102 may indicate the remaining value by displaying the remaining value to a delivery service worker using a user interface. The delivery service worker could then hand entity 120 cash in the amount of the remaining value. Mail system 102 may indicate the remaining value in the form of a message, signal, or instruction for automatically adding the remaining value to an account. The account could be with delivery service 100, with a bank, or some other institution. Based on this disclosure, those skilled in the art will appreciate how to modify existing delivery services to make delivery service 100.

In one embodiment, mail system 102 compensates entity 120 for the remaining value indicated by postage indicia 111. Entity 120 may have to present postage indicia 111 to delivery service 100. For instance, after receiving mail piece 110, entity 120 may have to return postage indicia 111 to delivery service 100 to be compensated for the remaining value of postage indicia 111. Delivery service 100 may also automatically compensate entity 120 for the value of postage indicia 111. For instance, mail system 101 may transfer mail piece 110 directly to mail system 102. Mail system 102 would then compensate entity 120 for the value of postage indicia 111 before entity 120 even receives mail piece 110.

In another embodiment, mail system 102 may modify postage indicia 111 to cancel the remaining value from postage indicia 111. The cancelled postage indicia 111 could also act as a receipt for entity 120 that is redeeming the remaining value of postage indicia 111.

Entity 120 does not necessarily have to be the one to redeem postage indicia 111. Postage indicia 111 may be traded between multiple people before being redeemed with delivery service 100. Thus, postage indicia may comprise a negotiable instrument.

The following are some examples as to how mail system 102 may compensate entity 120 for the remaining value of postage indicia 111. Mail system 102 may credit an account for entity 120 based on the remaining value of postage indicia 111. The account could be with delivery service 100 or some other institution. Mail system 102 may transfer funds to a bank account for entity 120 based on the remaining value of postage indicia 111. Mail system 102 may transfer cash to entity 120 based on the remaining value of postage indicia 111. For instance, mail system 102 may resemble an Automated Teller Machine (ATM). Entity 120 could feed postage indicia 111 into mail system 102. Mail system 102 processes postage indicia 111 to determine the remaining value and indicates the remaining value to entity 120. Mail system 102 then gives entity 120 cash in an amount equal to the remaining value. Mail system 102 could be automated much like an ATM.

In any of the above embodiments, postage indicia 111 could include anti-counterfeiting content to protect postage indicia 111 from being tampered with or copied. The anti-counterfeiting content also protects against un-authorized individuals redeeming postage indicia 111 instead of the intended party. The anti-counterfeiting content could include unique dot patterns, unique insignias, encrypted messages, or other kinds of coding imprinted on postage indicia 111. The anti-counterfeiting content could also include a special color of ink used to print some or all of postage indicia 111, such as a fluorescent red or yellow color.

Method of Operating a Delivery Service—FIG. 2

FIG. 2 illustrates a method 200 of operating a delivery service, such as delivery service 100, to deliver mail piece 110 in an example of the invention. Reference numbers for FIG. 2 are provided below in parenthesis. An entity gives mail piece 110 to the delivery service to have the delivery service deliver mail piece 110 to an entity. The delivery service receives mail piece 110 addressed to the entity (202). Mail piece 110 includes postage indicia 111. Postage indicia 111 indicates an initial value. The delivery service determines a cost for delivering mail piece 110 to the entity (204). The delivery service modifies postage indicia 111 to indicate a remaining value (206) wherein the remaining value indicates the initial value reduced by the cost for delivering mail piece 110. The delivery service delivers mail piece 110 to the entity (208). The delivery service compensates the entity for the remaining value indicated by postage indicia 111 (210). To compensate the entity, the entity may have to present postage indicia 111 back to the delivery service to redeem the remaining value of postage indicia 111. The entity may also be automatically compensated by the delivery service by crediting an account.

The following are other embodiments of method 200. The embodiments will be described by the operation of the delivery service. In one embodiment, the delivery service may modify postage indicia 111 to cancel the remaining value from postage indicia 111. The cancelled postage indicia 111 could also act as a receipt for the entity redeeming the remaining value of postage indicia 111.

The following are some examples as to how the delivery service may compensate entity 120 for the remaining value of postage indicia 111. The delivery service may credit an account for entity 120 based on the remaining value of postage indicia 111. The account could be with the delivery service or some other institution. The delivery service may transfer funds to a bank account for entity 120 based on the remaining value of postage indicia 111. The delivery service may transfer cash to entity 120 based on the remaining value of postage indicia 111.

In any of the above embodiments, postage indicia 111 could include anti-counterfeiting content to protect postage indicia 111 from being tampered with or copied. The anti-counterfeiting content also protects against un-authorized individuals redeeming postage indicia 111 instead of the intended party. The anti-counterfeiting content could include unique dot patterns, unique insignias, encrypted messages, or other kinds of coding imprinted on postage indicia 111. The anti-counterfeiting content could also include a special color of ink used to print some or all of postage indicia 111, such as a fluorescent red or yellow color.

Printing System—FIG. 3

FIG. 3 illustrates a printing system 301 for printing postage indicia 310 in an example of the invention. Postage indicia 310 could represent postage indicia 111 of FIG. 1. Postage indicia 310 includes a first monetary value component 311 and a second monetary value component 312. First monetary value component 311 is designated for compensating a delivery service for delivery of a mail piece. Second monetary value component 312 is designated for transferring funds via postage indicia 310. For instance, first monetary value component 311 may indicate 34¢, which is the cost for delivering an envelope. Second monetary value component 312 may indicate $20, which is the amount being transferred via postage indicia 310.

Mail systems 101 and 102 of FIG. 1 may be configured to read second monetary value component 312 in order to determine the amount represented by second monetary value component 312. Mail systems 101 and 102 may then indicate the amount represented by second monetary value component 312, transfer an amount equal to the amount represented by second monetary value component 312, or perform some other action.

EXAMPLE 1

Assume that a college student needs $300 to pay for college. The student's parents can send the money using postage for the USPS. The parents would send the student a letter. The cost of delivery of the letter is currently 34¢. To send $300, the parents would acquire postage in the amount of $300.34. The parents would affix the postage to an envelope containing the letter and give the letter to the USPS. The USPS receives the envelope and processes the envelope to determine the cost for delivery of the envelope. The USPS then modifies the postage to cancel a portion of the value of the postage equal to the cost for delivery of the envelope, which is 34¢. The USPS does not cancel the entire value of the postage, so the postage still has a remaining value of $300. The USPS then delivers the envelope to the student. The student can then take the postage back to the USPS. The USPS compensates the student for the remaining value of the postage, which is $300. The USPS could transfer money to an account for the student or just give the student cash in the amount of $300.

EXAMPLE 2

Assume that a buyer wants to purchase an item from a vender. The buyer does not know the exact cost of the item plus tax and shipping. The buyer does know that the cost will not exceed $200. The cost of delivery of an envelope containing a purchase order for the item is currently 34¢. Thus, the buyer would acquire postage in the amount of $200.34. The sender affixes the postage to the envelope containing the purchase order for the item and gives the envelope to the USPS. The USPS receives the envelope and processes the envelope to determine the cost for delivery of the envelope. The USPS then modifies the postage to cancel a portion of the value of the postage equal to the cost for delivery of the envelope, which is 34¢. The USPS does not cancel the entire value of the postage, so the postage still has a remaining value of $200. The USPS then delivers the envelope to the vender.

The vender calculates the cost of the item plus tax and the cost of shipping the item to the buyer. Assume that the cost of the item plus tax is $130 and the cost of shipping the item to the buyer is $20. As is evident, the buyer sent $50 too much to the vender. The vender can then take the postage back to the USPS. The USPS compensates the vender for the remaining value of the postage, which is $200. The vendor keeps $130 and obtains $70 worth of postage. The $70 worth of postage includes $20 for shipping the item to the buyer and the $50 that the buyer over-paid for the item. The vender gives the item to the USPS for delivery. The USPS receives the item and processes the item to determine the cost for delivery of the item. The USPS then modifies the postage to cancel a portion of the value of the postage equal to the cost for delivery of the item, which is $20. The USPS does not cancel the entire value of the postage, so the postage still has a remaining value of $50. The USPS delivers the item to the buyer. The buyer can then take the postage back to the USPS. The USPS compensates the buyer for the remaining value of the postage, which is $50.

The above examples illustrate that the invention provides an easy and convenient way to transfer funds using postage.

The invention claimed is:

1. A delivery service, comprising:

a first mail system configured to receive a mail piece addressed to an entity and including postage indicia indicating an initial value, determine a cost for delivering the mail piece to the entity, modify the postage indicia to indicate a remaining value wherein the remaining value indicates the initial value reduced by the cost for delivering the mail piece, and transfer the mail piece; and a second mail system configured to receive the postage indicia indicating the remaining value, process the postage indicia to determine the remaining value of the postage indicia, and indicate the remaining value of the postage indicia wherein the postage indicia with the remaining value is a negotiable instrument configured to allow multiple people to electronically negotiate and trade the postage indicia between each other before the postage indicia is redeemed electronically, by crediting a valid account with the remaining value of the postage indicia.

2. The delivery service of claim 1 wherein the second mail system is further configured to:

modify the postage indicia indicating the remaining value to cancel the remaining value of the postage indicia.

3. The delivery service of claim 1 wherein the second mail system is further configured to:

compensate the entity for the remaining value of the postage indicia.

4. The delivery service of claim 3 wherein the second mail system is further configured to:

credit an account for the entity based on the remaining value of the postage indicia to compensate the entity.

5. The delivery service of claim 3 wherein the second mail system is further configured to:

transfer funds to a bank account for the entity based on the remaining value of the postage indicia to compensate the entity.

6. The delivery service of claim 3 wherein the second mail system is further configured to:

transfer cash to the entity based on the remaining value of the postage indicia to compensate the entity.

7. The delivery service of claim 1 wherein the postage indicia includes anti-counterfeiting content.

8. The delivery service of claim 1 wherein the postage indicia comprises text printed on the mail piece.

9. The delivery service of claim 1 wherein the postage indicia comprises a barcode printed on the mail piece.

10. The, delivery service of claim 1 wherein the second mail system comprises a user interface configured to display the remaining value of the postage indicia.

11. A method of operating a delivery service, the method comprising:

receiving a mail piece addressed to an entity and including postage indicia indicating an initial value;

determining a cost for delivering the mail piece to the entity;

modifying the postage indicia to indicate a remaining value wherein the remaining value indicates the initial value reduced by the cost for delivering the mail piece, wherein the postage indicia with the remaining value is a negotiable instrument configured to allow multiple people to negotiate and trade the postage indicia between each other before the postage indicia is redeemed with an automated teller machine (ATM);

delivering the mail piece to the entity; and compensating a particular entity that presents the postage indicia for the remaining value indicated by the postage indicia without requiring a data center to dispatch the remaining value, wherein the automated teller machine (ATM) processes the postage indicia to determine the remaining value and disburses cash in the amount equal to the remaining value.

12. The method of claim 11 further comprising:

modifying the postage indicia indicating the remaining value to cancel the remaining value.

13. The method of claim 11 further comprising:

receiving the postage indicia that indicates the remaining value from the entity prior to compensating the entity.

14. The method of claim 11 wherein compensating the entity comprises:

crediting an account for the entity based on the remaining value of the postage indicia.

15. The method of claim 11 wherein compensating the entity comprises:

transferring funds to a bank account for the entity based on the remaining value of the postage indicia.

16. The method of claim 11 wherein compensating the entity comprises:

transferring cash to the entity based on the remaining value of the postage indicia.

17. The method of claim 11 wherein the postage indicia includes anti-counterfeiting content.

* * * * *

UNITED STATES PATENT AND TRADEMARK OFFICE

CERTIFICATE OF CORRECTION

PATENT NO. : 7,251,608 B2
APPLICATION NO. : 10/086288
DATED : July 31, 2007
INVENTOR(S) : Robert C. Mayes et al.

It is certified that error appears in the above-identified patent and that said Letters Patent is hereby corrected as shown below:

In column 8, line 3, in Claim 10, after “The” delete “,”.

Signed and Sealed this

Fifteenth Day of July, 2008

JON W. DUDAS
*Director of the United States Patent and Trademark Office*